United States Patent [19]
Tojyo

[11] 4,101,201
[45] Jul. 18, 1978

[54] LOW MAGNIFICATION MICROSCOPE OBJECTIVE

[75] Inventor: Tsutomu Tojyo, Hachiouji, Japan

[73] Assignee: Olympus Optical Co., Ltd., Japan

[21] Appl. No.: 754,634

[22] Filed: Dec. 27, 1976

[30] Foreign Application Priority Data

Dec. 26, 1975 [JP] Japan .................... 51/157485

[51] Int. Cl.² .................. G02B 9/02; G02B 21/02
[52] U.S. Cl. .......................... 350/175 ML; 350/230
[58] Field of Search .................. 350/175 ML, 230

[56] References Cited
U.S. PATENT DOCUMENTS 3,975,087  8/1976  Shoemaker .................. 350/230 X
4,045,126  8/1977  Shoemaker .................. 350/175 ML

*Primary Examiner*—Paul A. Sacher
*Attorney, Agent, or Firm*—Cushman, Darby & Cushman

[57] ABSTRACT

A low magnification microscopic objective comprising two components of four elements for which radii of curvature on respective lens surfaces are selected as large as possible and wherein various aberrations are favorably corrected.

1 Claim, 5 Drawing Figures

LOW MAGNIFICATION MICROSCOPE OBJECTIVE

BACKGROUND OF THE INVENTION (a) Field of the invention

The present invention relates to a low magnification microscope objective and, more specifically, to an objective of achromat designed for magnification x4 and N.A. 0.1.

(b) Description of the prior art

An objective of achromat for magnification on the order of x4, there have hitherto been offered lens systems consisting of two components of four elements including ones having small radii of curvature on the lens surfaces. Lenses having such small radii of curvature on their surfaces cannot be manufactured with high productivity since it is impossible to arrange a large number of such lenses on a grinding support at a time. Further, the aforementioned objective consisting of two components of four lens elements were not satisfactory in that they permitted microscopic observation of flat image only within narrow ranges.

SUMMARY OF THE INVENTION

It is therefore a general object of the present invention to provide an objective wherein radii of curvature are selected at such degrees large as to assure high productivity, various aberrations are corrected favorably and flatness of image plane is improved.

DETAILED DESCRIPTION OF PREFERRED EMBODIMENTS

Figure 1:
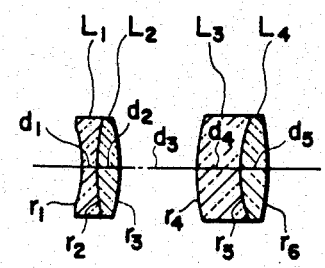
FIG. 1 shows a sectional view illustrating composition of the objective according to the present invention.
Figures 2A, 2B:
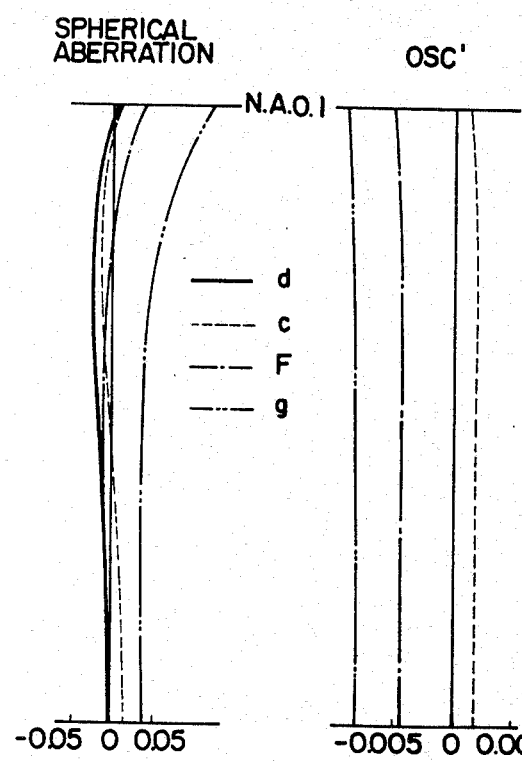
FIG. 2A through FIG. 2D show curves illustrating aberration characteristics of the lens system shown in FIG. 1.
Figures 2C, 2D:
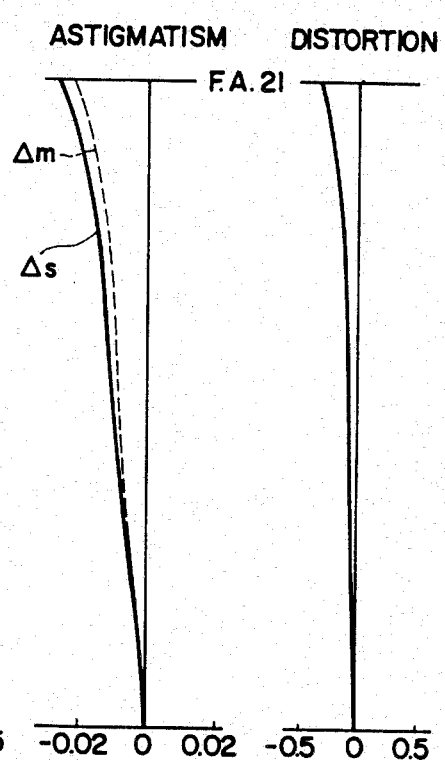

The objective lens system according to the present invention comprises, as shown in FIG. 1, a first negative cemented meniscus lens component consisting of a biconcave lens element $L_1$ and a biconvex lens element $L_2$, and a second positive cemented lens component consisting of a negative meniscus lens element $L_3$ and a biconvex lens element $L_4$. Further, the objective according to the present invention have the munerical data defined below:

$f = 1$, $NA = 0.1$, $\beta = -3.973 \times$
$W.D = 0.8434$

| | | | |
|---|---|---|---|
| $r_1 = -0.2703$ | | | |
| | $d_1 = 0.0492$ | $n_1 = 1.51633$ | $\nu_1 = 64.1$ |
| $r_2 = 1.0278$ | | | |
| | $d_2 = 0.0527$ | $n_2 = 1.71285$ | $\nu_2 = 43.4$ |
| $r_3 = -0.5009$ | | | |
| | $d_3 = 0.2530$ | | |
| $r_4 = 0.7140$ | | | |
| | $d_4 = 0.1230$ | $n_3 = 1.78472$ | $\nu_3 = 25.7$ |
| $r_5 = 0.3562$ | | | |
| | $d_5 = 0.0735$ | $n_4 = 1.50378$ | $\nu_4 = 66.8$ |
| $r_6 = -0.7532$ | | | | wherein the reference symbols represent as follows:

$f$: overall focal length of the lens system as a whole
N.A.: numerical aperture
$\beta$: magnification
W.D.: working distance
$r_1$ through $r_6$: radii of curvature on respective lens surfaces
$d_1$ through $d_5$: thicknesses of respective lens elements and airspace therebetween
$n_1$ through $n_4$: refractive indices of respective lens elements
$\nu_1$ through $\nu_4$: Abbe's numbers of respective lens elements In such a lens system comprising two groups of four elements, it is necessary to design the first surface of the biconcave lens $L_1$ in the first component as a concave surface facing the object side and select a small radius $r_1$ of curvature on said surface. However, such a small radius of curvature will unavoidably lower productivity as is already described above.

In the lens system according to the present invention, the radius of curvature $r_1$ on the first surface is selected at a relatively large level so that a large number of lenses can be set on a grinding support at a time. Though it is impossible to correct spherical aberration sufficiently with such a first lens element, such aberration is partially corrected by the second lens component in the lens system according to the present invention. Speaking concretely, radii of curvature $r_4$ and $r_5$ on both the surfaces of the negative meniscus lens $L_3$ and thickness $d_4$ thereof are selected as defined in the aforementioned numerical data. Further, radii of curvature $r_1$, $r_4$, $r_5$ and $r_6$ are selected at such levels that astigmatism can be corrected without reducing number of lenses to be set on a grinding support at a time. On the other hand, it is necessary, needless to say, to favorably correct coma for improving flatness of image plane. When the lens system is focused on the center of the image plane, however, a flatter image plane can be obtained by correcting meridional astigmatism rather than reducing astigmatic difference.

On the basis of this fact, the lens system according to the present invention is so designed as to correct astigmatism more favorably in the meridional direction than in sagital direction.

As for chromatic aberration, it is corrected as favorably as possible by the first and second lens components respectively so that the entire objective can assure a minimum chromatic aberration. For achieving this purpose, Abbe's number is selected for each lens element as defined in the preferred embodiments.

As is understood from the foregoing descriptions, the lens system according to the present invention is designed in such a way that respective lens surfaces have radii of curvature large enough to permit arranging a large number of lenses on a grinding support at a time, and assure favorable correction of various aberrations in combination with improvement in flatness of the image plane.

I claim:

1. A low magnification objective comprising a first negative cemented lens component having a concave surface facing the object side and consisting of a biconcave lens element and a biconvex lens element, and a second positive cemented lens component consisting of a negative meniscus lens element and a biconvex lens element, and said objective having the following numerical data:

| $f = 1$ | | | |
|---|---|---|---|
| $r_1 = -0.2703$ | $d_1 = 0.0492$ | $n_1 = 1.51633$ | $\nu_1 = 64.1$ |
| $r_2 = 1.0278$ | $d_2 = 0.0527$ | $n_2 = 1.71285$ | $\nu_2 = 43.4$ |

-continued

| f = 1 | | | |
|---|---|---|---|
| $r_3 = -0.5009$ | $d_3 = 0.2530$ | | |
| $r_4 = 0.7140$ | $d_4 = 0.1230$ | $n_3 = 1.78472$ | $\nu_3 = 25.7$ |
| $r_5 = 0.3562$ | $d_5 = 0.0735$ | $n_4 = 1.50378$ | $\nu_4 = 66.8$ |
| $r_6 = 0.7532$ | | | | wherein the reference symbol $f$ represent the overall focal length of the objective as a whole, the reference symbols $r_1$ through $r_6$ designate radii of curvature on respective lens surfaces, the reference symbols $d_1$ through $d_5$ denote thicknesses of respective lens elements and the airspace therebetween, the reference symbols $n_1$ through $n_4$ represent refractive indices of respective lens elements and the reference symbols $\nu_1$ through $\nu_4$ designate Abbe's numbers of respective lens elements.

* * * * *